(No Model.)
E. EGGER & F. A. WESSEL.
ARMATURE.
No. 518,312.  Patented Apr. 17, 1894.
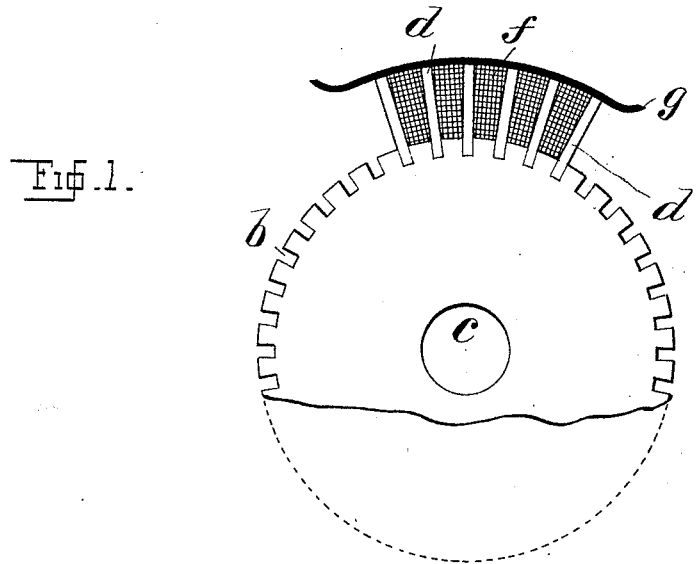
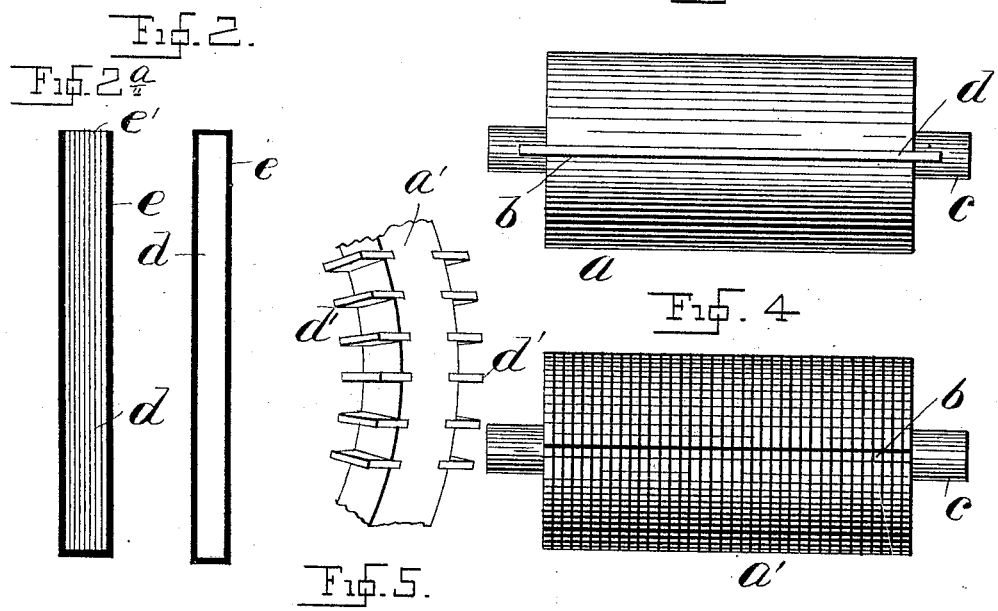
Witnesses
Wm H. Courtland
Leocadia M. Lennan
Inventors
Ernst Egger and Ferdinand A. Wessel
By their Attorney.
Edward P. Thompson
THE NATIONAL LITHOGRAPHING COMPANY,
WASHINGTON, D. C.

UNITED STATES PATENT OFFICE.

ERNST EGGER AND FERDINAND A. WESSEL, OF NEW YORK, N. Y., ASSIGNORS OF ONE-FOURTH TO AARON NAUMBURG, OF SAME PLACE.

ARMATURE.

SPECIFICATION forming part of Letters Patent No. 518,312, dated April 17, 1894.

Application filed May 17, 1893. Serial No. 474,509. (No model.)

*To all whom it may concern:*

Be it known that we, ERNST EGGER, a subject of the Emperor of Austria-Hungary, and FERDINAND A. WESSEL, a citizen of the United States of America, residents of New York, in the county and State of New York, have invented certain new and useful Improvements in Armatures, (Case No. 1,) of which the following is a specification.

Our invention relates to a mechanical construction of an armature for dynamos or electric motors, and to provide a toothed armature core, especially those with very deep grooves. It has been customary to build up those armature cores of toothed disks, which had teeth of the full depth as required. We intend to provide an armature core where only very small slots are formed, and insert the teeth therein. In this way the armature core may be constructed very rapidly, economically and well insulated.

The invention is described by reference to the accompanying drawings, in which—

Figure 1 is an end view of an armature where the wires are in section, and where portions are omitted in order to exhibit clearly the exact nature of the construction. Fig. 2 is an end view on a larger scale of one of the detail elements of Fig. 1. Fig. 2ª is a modification of that in Fig. 2. Figs. 3 and 4 are side elevations of different styles of armature core showing one of the grooves hereinafter explained. Fig. 5 is a perspective view of a ring armature to show a modification.

The device embodying the invention consists of the combination of either a solid core $a$ as in Fig. 3, or of a laminated core $a'$ as in Fig. 4, provided on the periphery with longitudinal grooves $b$, only one of which is shown in Fig. 4, and many of which are shown in Fig. 1, the said groove being parallel to the shaft $c$, and arranged at distances around a whole cylinder; sheet-iron plates $d$ covered all around with insulation $e$ to prevent Foucault currents, and fitting tightly in the said grooves, and projecting therefrom radially and projecting at ends as illustrated in Fig. 3; electric conductors wound on the core between the said plates $d$ and a binding insulating sheet $g$, as for example cloth or micanite, wound circularly upon the outer ends of the plates $d$ and against the wires $f$, as usually.

In Fig. 5 is shown a ring armature core, having grooves in the sides, instead of on the cylindrical surface, and plates $d'$ fitting in said grooves. The plates radiate from the center of the ring.

In Fig. 2ª, the insulation is omitted at the outer portion or end $e'$ to save gap between field magnet and core. The plates in each case are preferably laminated plates.

An advantage connected with this invention is due to the fact that the plates $d$ or $d'$ between the wires $f$ are insulated; a feature not occurring in armatures of ordinary construction.

We claim as our invention—

1. An armature consisting of the combination of a core having grooves, insulated iron plates fitting in said grooves, and conductors wound between the plates and on the core.

2. An armature consisting of the combination of a cylindrical core provided with grooves cut in the surface of the core, insulated plates fitting in said grooves and projecting beyond the ends of the core, and wires around the core and between said plates.

3. An armature consisting of the combination of a cylindrical core provided with grooves cut in the surface of the core, insulated plates fitting in said grooves and projecting beyond the ends of the core, and wires around the core and between said plates, thereof parallel to the axis of the core.

4. An armature consisting of the combination of a cylindrical core provided with grooves cut in the surface of the core, insulated iron plates fitting in said grooves, and wires around the core and between said plates thereof parallel to the axis of the core.

In testimony that we claim the foregoing as our invention we have signed our names, in presence of two witnesses, this 12th day of May, 1893.

ERNST EGGER.
FERDINAND A. WESSEL.

Witnesses:
LEOCADIA M. LENNAN,
WM. A. COURSEN, Jr.